(12) United States Patent
Poirier et al.

(10) Patent No.: US 11,040,467 B1
(45) Date of Patent: Jun. 22, 2021

(54) MOLD MADE FROM AN ADDITIVE MANUFACTURING TECHNOLOGY

(71) Applicants: Bombardier Transportation GmbH, Berlin (DE); Bell Textron Inc., Mirabel (CA)

(72) Inventors: Daniel Poirier, Mirabel (CA); Hubert Michaud, Boisbriand (CA)

(73) Assignees: Bombardier Transportation GmbH, Berlin (DE); Bell Textron Inc., Mirabel (CA)

( * ) Notice: Subject to any disclaimer, the term of this patent is extended or adjusted under 35 U.S.C. 154(b) by 0 days.

(21) Appl. No.: 17/124,566

(22) Filed: Dec. 17, 2020

(30) Foreign Application Priority Data

Dec. 18, 2019 (CA) .................................. CA 3065462

(51) Int. Cl.
*B29C 33/38* (2006.01)
*B33Y 10/00* (2015.01)
*B33Y 80/00* (2015.01)
*B29C 70/46* (2006.01)

(52) U.S. Cl.
CPC .......... *B29C 33/3842* (2013.01); *B29C 70/46* (2013.01); *B33Y 10/00* (2014.12); *B33Y 80/00* (2014.12)

(58) Field of Classification Search
CPC ............................ B29C 33/3842; B29C 70/46
See application file for complete search history.

(56) References Cited

U.S. PATENT DOCUMENTS

2015/0102523 A1\* 4/2015 Russell ................. B28B 7/0091
264/255
2015/0336299 A1\* 11/2015 Tanugula ................ B29C 51/34
264/16

\* cited by examiner

*Primary Examiner* — James Sanders
(74) *Attorney, Agent, or Firm* — The Webb Law Firm

(57) ABSTRACT

An open mold for producing components made of a moldable material such as layered composite materials is made from an additive manufacturing technology. The mold includes at least two compatible mold segments which precisely interlock with and abut against each other. The mold thereby made may be larger than the limited printing area of an additive manufacturing machine.

19 Claims, 6 Drawing Sheets

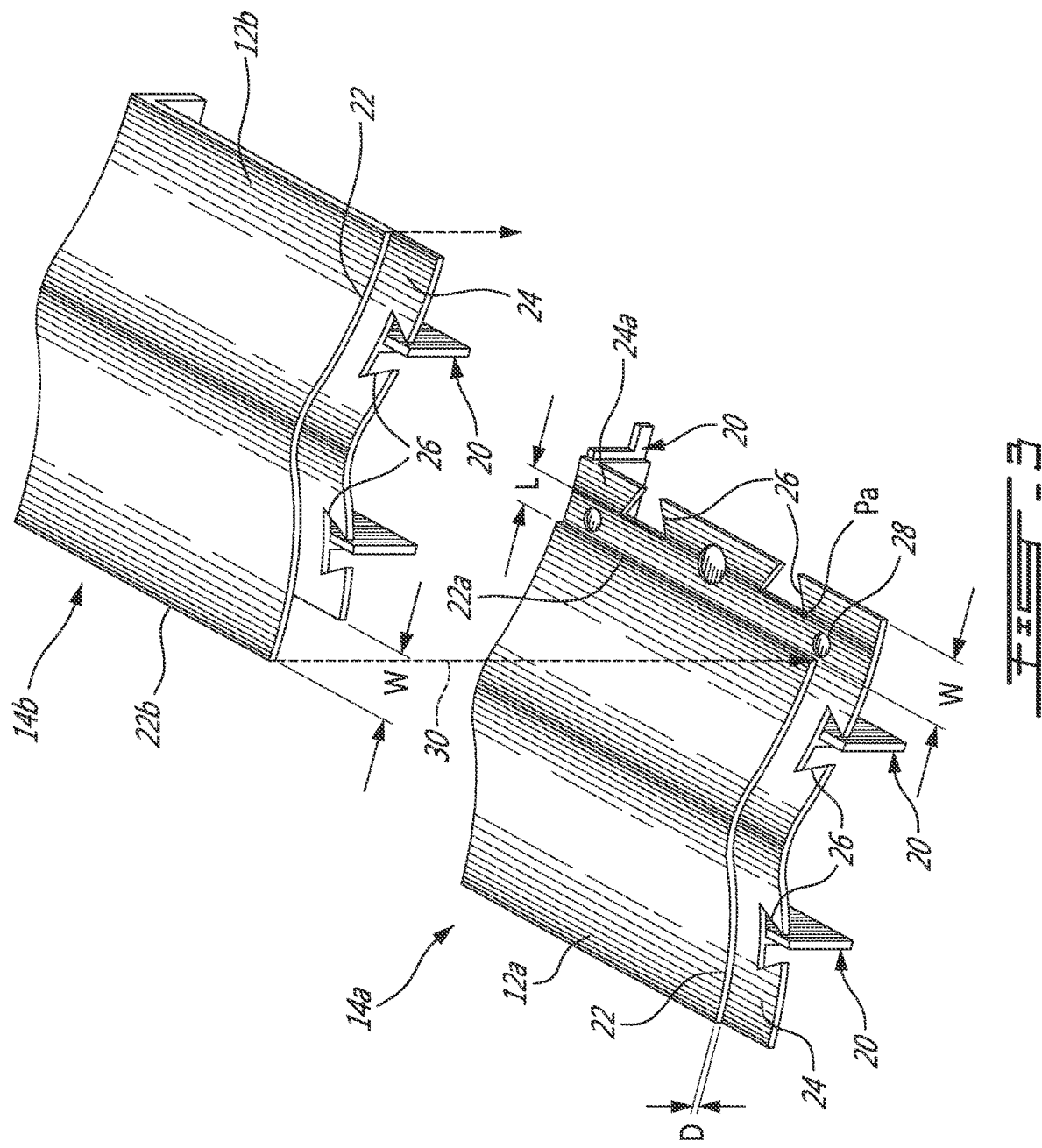

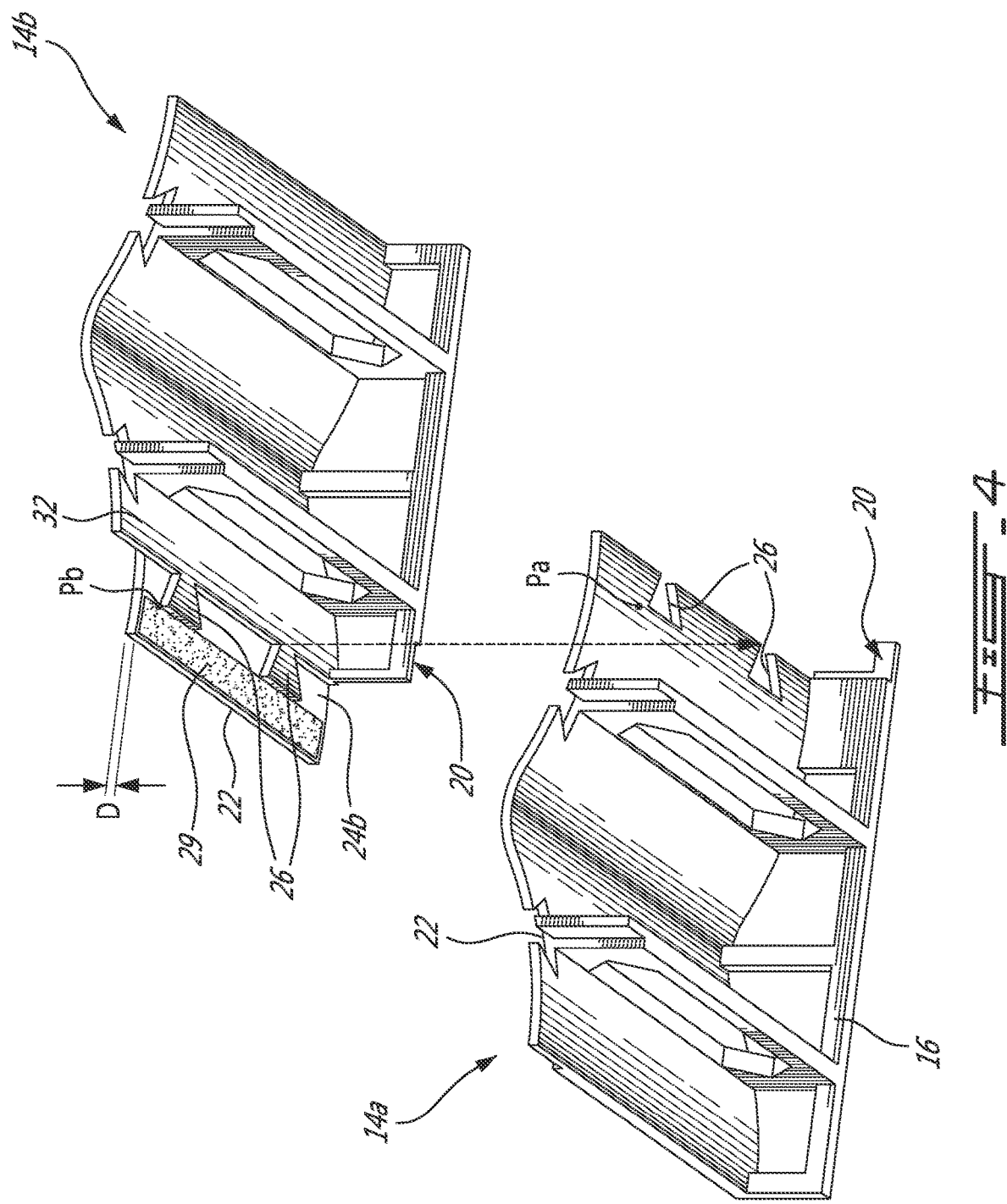

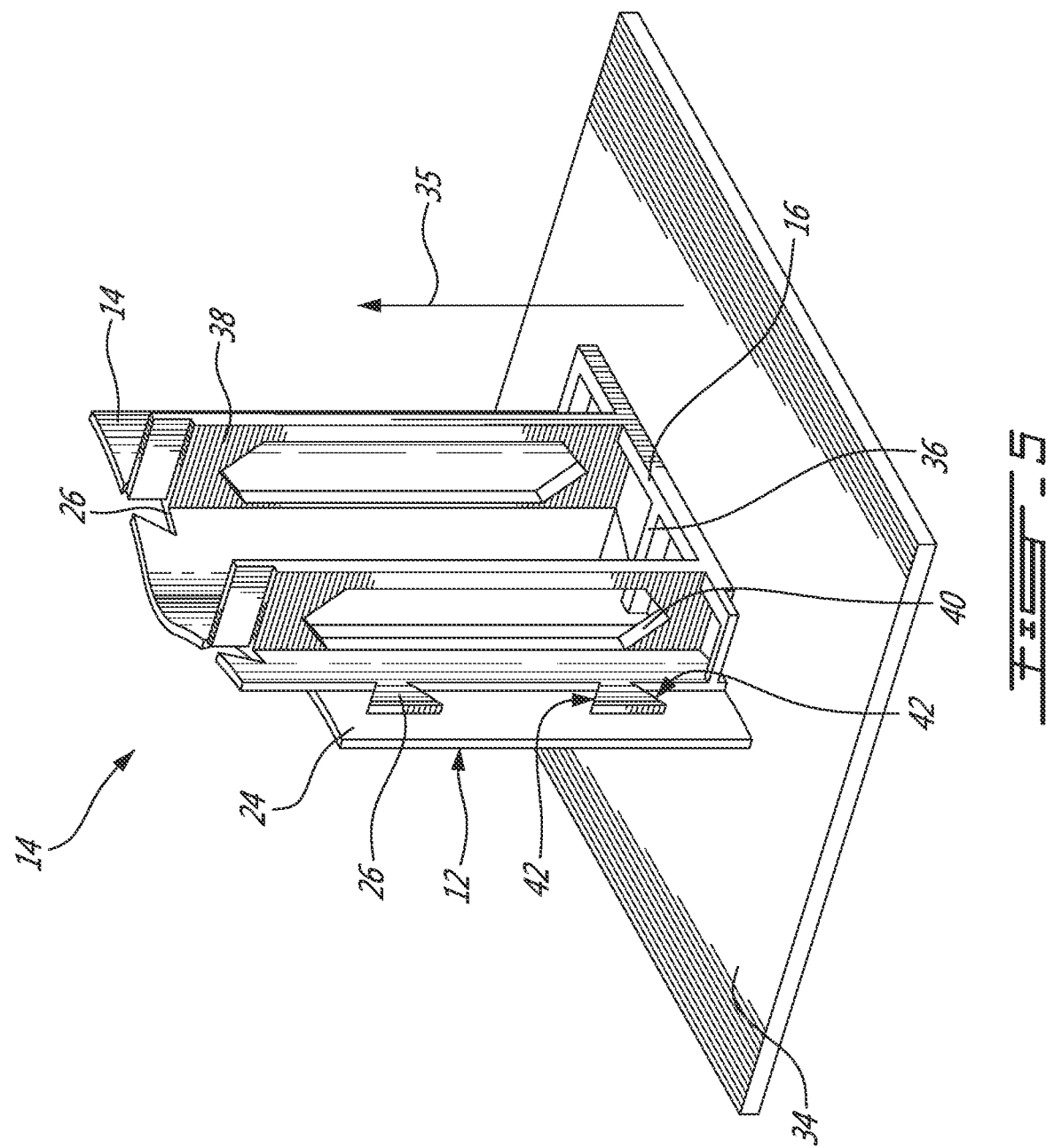

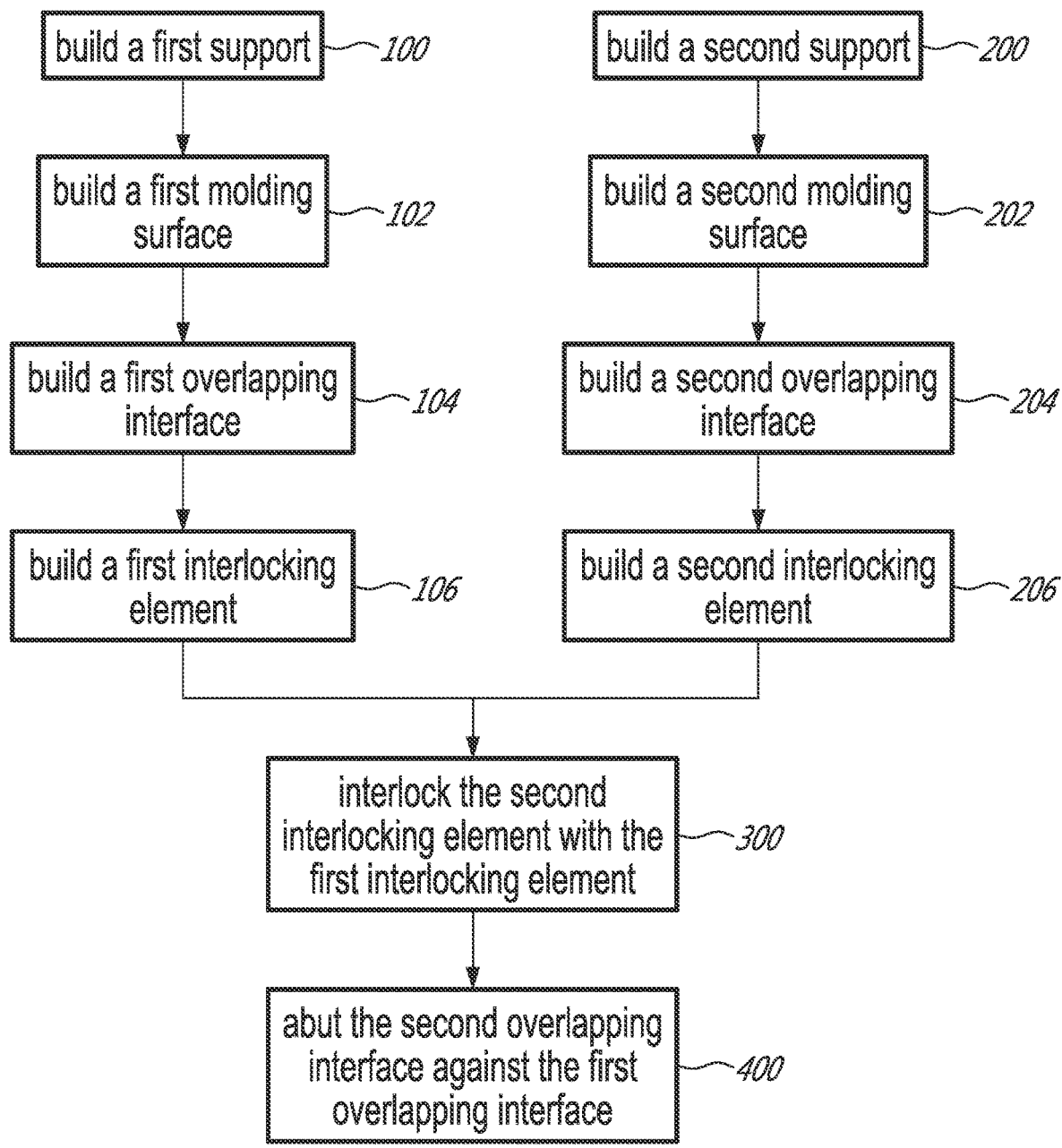

MOLD MADE FROM AN ADDITIVE MANUFACTURING TECHNOLOGY

CROSS-REFERENCE TO RELATED APPLICATION

This application claims priority to Canadian Patent Application No. 3065462 filed Dec. 18, 2019, the disclosure of which is hereby incorporated by reference in its entirety.

BACKGROUND OF THE INVENTION

Field of the Invention

The present invention generally relates to the field of molds for the production of molded parts which can be made of composite materials for example. More specifically, the invention relates to a mold made using an additive manufacturing technology and to a method of producing such a mold.

Description of Related Art

Molds used in the production of components made from composite materials using a reinforcing fabric in a matrix are typically themselves made out of composite materials. Current mold technology first requires the production of a plug, which is an intermediate component representing the surface of the composite material component that is to be ultimately molded in the mold. The plug is then polished to a smooth finish. The mold, itself made from layered composite materials, is then molded over the plug. Only then can the mold be used to produce components made from layered composite materials. The mold manufacturing process is rather long, tedious, and expensive.

Recent years have seen the advent of additive manufacturing technologies, also known as 3D printing techniques, which may directly produce finished components, thereby saving time and money. Such additive manufacturing technologies have been used to produce molds for the production of components made of layered composite materials. These printed molds are however limited to the size of the additive manufacturing machine used to print them. This is a problem when the production of large composite components requires a mold exceeding the capacity of the additive manufacturing machine.

For molds larger than the build chamber of the additive manufacturing machine, Stratasys™, a manufacturer of additive manufacturing machines, published in its Design Guide that molds may be segmented. The different segments of the mold may then by joined with secondary operations, such as thermal welding or structural bonding. To assist in assembly, Stratasys™ suggests using joint features incorporated into the mold design to ensure proper fit and alignment. Common assembly joining techniques such as tongue and groove, dovetails, and saw-tooth patterns are recommended.

These guidelines however fall short of teaching how to precisely locate molding surfaces of each segment with respect to one another, which is very important in order to produce a seamless surface finish on the composite component molded therein.

There is therefore a need for a mold made from an additive manufacturing technology capable of producing large components made from layered composite materials.

SUMMARY OF THE INVENTION

It is an object of the present invention to provide a mold for manufacturing layered composite materials and a method of manufacturing such a mold that overcomes or mitigates one or more disadvantages of known molds and methods of making them, or at least provides a useful alternative.

The invention provides the advantages of precisely locating the surfaces of adjacent mold segments so as to create a continuous molding surface from one segment to another. Moreover, the bonding area between segments is improved and the sealing of the molding surface is also improved.

In accordance with an embodiment of the present invention, there is provided an open mold for producing components made of a moldable material such as layered composite materials. The mold comprises a first mold segment and a second mold segment both made from an additive manufacturing technology. The first mold segment comprises:
- a first support structure defining a support plane underneath;
- a first molding surface operative to receive the moldable material. The first molding surface is supported by the first support structure. The first molding surface has a first edge;
- a first overlapping interface located between the support plane and the first edge at a first predetermined distance from the first edge. The first overlapping interface extends behind the first edge;
- a first interlocking element located in the first overlapping interface.

The second mold segment comprises:
- a second support structure having the support plane underneath;
- a second molding surface operative to receive the moldable material. The second molding surface is supported by the second support structure. The second molding surface has a second edge;
- a second overlapping interface located between the support plane and the second edge at the first predetermined distance from the second edge. The second overlapping interface extends beyond the second molding surface; and
- a second interlocking element located in the second overlapping interface. The second interlocking element is compatible with the first interlocking element and interlocks in an interlocking plane the first mold segment with the second mold segment. The first predetermined distance is measured in a direction normal to the interlocking plane.

The first overlapping interface overlaps the second overlapping interface. The second overlapping interface abuts against the first overlapping interface in a direction normal to the interlocking plane so that the first edge is juxtaposed with the second edge and so that the first molding surface is juxtaposed with the second molding surface. The term "juxtaposed" here is understood to mean "placed side by side" and not "contrasted" or "compared".

The first interlocking element may be a male interlocking element. In this case the second interlocking element is a female interlocking element and vice-versa.

Preferably, the first interlocking element is located remotely from the first edge and at a second predetermined distance from the first edge while the second interlocking element is also located remotely from the second edge and at the same second predetermined distance from the second edge. In this case, the predetermined distance is measured in the interlocking plane which, preferably, is parallel to the support plane.

Optionally, the first mold segment may further comprise a sealing zone in the first overlapping interface. The sealing zone is located between the first edge and the first interlocking element. The second mold segment then comprises a depression in the second overlapping interface. The depression contains an adhesive contacting the sealing zone.

Alternatively, the second mold segment may be the one comprising the sealing zone which is then located in the second overlapping interface. The sealing zone is located between the second edge and the second interlocking element. The first mold segment then comprises a depression in the first overlapping interface. The depression contains the adhesive which contacts the sealing zone.

The first edge and the second edge may be parallel. The first molding surface and the second molding surface may be tangent to each other in a plane that is normal to the first edge.

Preferably, the second mold segment is welded to the first mold segment along the first edge and a finishing layer is applied on the first molding surface and on the second molding surface.

More preferably, the first support structure and the second support structure partially overlap each other in a second overlapping interface. An adhesive may also be applied in this second overlapping interface.

In accordance with another embodiment of the present invention, there is provided a method for manufacturing an open mold adapted to produce components made of a moldable material such as layered composite materials. The method comprises:
a) manufacturing a first mold segment using an additive manufacturing technology. The manufacturing the first mold segment further comprises:
   building a first support;
   building a first molding surface having a first edge. The first molding surface is connected to the first support;
   building a first overlapping interface at a predetermined distance from the first edge. The first overlapping interface is located between the support plane and the first edge. The first overlapping interface extends behind the first edge;
   building a first interlocking element in the first overlapping interface;
b) manufacturing a second mold segment using an additive manufacturing technology.
The manufacturing the second mold segment further comprises:
   building a second support;
   building a second molding surface having a second edge. The second molding surface is connected to the second support;
   building a second overlapping interface at the predetermined distance from the second edge. The second overlapping interface is located between the support plane and the second edge. The second overlapping interface extends beyond the second edge;
   building a second interlocking element in the second overlapping interface;
c) interlocking the second interlocking element with the first interlocking element so as to compatibly interlock the first mold segment with the second mold segment in an interlocking plane, said predetermined distance being measured in a direction normal to said interlocking plane; and
d) abutting the second overlapping interface against the first overlapping interface in a direction normal to the interlocking plane so as to juxtapose the second edge with the first edge and the second molding surface with the first molding surface.

Preferably, the molding surface may be tangent to the first molding surface in a plane normal to the first edge.

The interlocking may further comprise interlocking in a plane parallel to a support plane defined by the first support and the second support.

Optionally, the method may further comprise applying an adhesive in a depression of one of the first and the second overlapping interfaces and then pressing the first and the second mold components against each other so as to wet a sealing zone of the other one of the first and the second overlapping interfaces with the adhesive.

The method may also comprise welding the second mold segment to the first mold segment along the first edge.

Optionally, the method may further comprise polishing the first molding surface and the second molding surface. It may also include applying a finishing layer on the first molding surface and on the second molding surface.

Optionally, the method may further comprise overlapping the first support structure with the second support structure, thereby defining a second overlapping interface. It may also include applying an adhesive on the second overlapping interface.

BRIEF DESCRIPTION OF DRAWINGS

These and other features of the present invention will become more apparent from the following description in which reference is made to the appended drawings wherein:

FIG. 3 is an isometric exploded view from above of two adjacent segments of the mold of FIG. 1;

FIG. 4 is an isometric exploded view from below of the two adjacent mold segments of FIG. 3;

FIG. 5 is an isometric view of one of the mold segments of the mold of FIG. 1 as it is built on a printing bed of an additive manufacturing machine; and FIG. 6 is a schematic of a method of manufacturing a mold made using an additive manufacturing technology in accordance with an embodiment of the present invention.

DETAILED DESCRIPTION OF THE INVENTION

The present invention relates to an open mold for layered composite materials and a method for manufacturing such a mold where the mold is made of segments which interlock and abut precisely with each other to generate a continuous molding surface.

Figure 1:
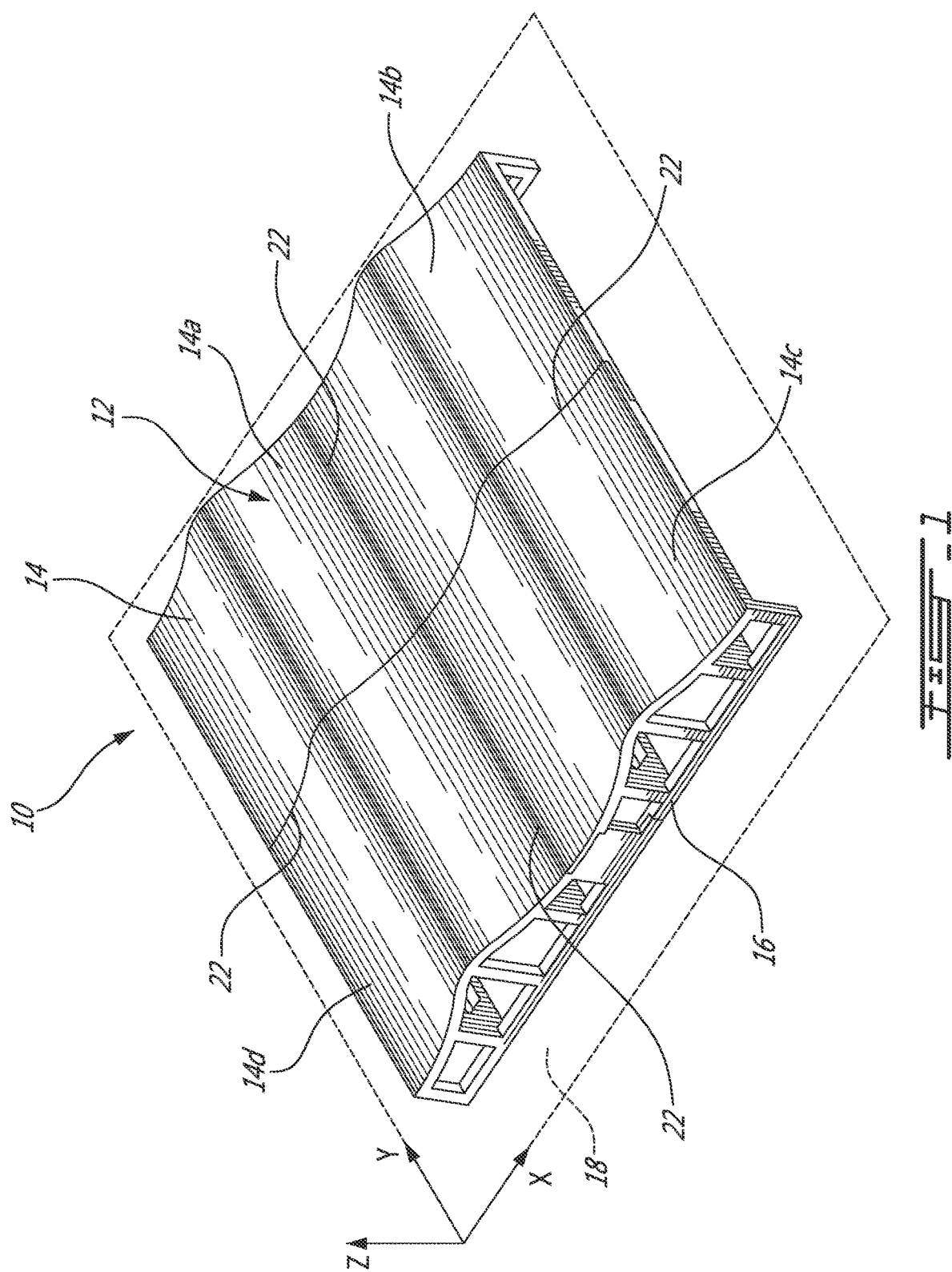
FIG. 1 is an isometric view from above of a mold in accordance with an embodiment of the present invention.

FIG. 1, now referred to, shows a mold 10 and its molding surface 12. The mold 10 as shown only stretches to the limits of a part to be molded and does not include trimming extensions to the molding surface 12 which are typically added to provide a neat cutting surface. The mold 10 is of the open type and is adapted to receive a moldable material, such as reinforced layered composite materials, in order to produce components made of this moldable material. The mold 10 is made from an additive manufacturing technology, such as VAT Photopolymerization, Material Jetting, Binder Jetting, Material Extrusion (commonly known as Fuse Deposition Modelling (FDM) or 3D Printing), Powder Bed Fusion, Sheet Lamination or Directed Energy Deposition or any other adequate additive manufacturing technology. Guidelines for to the selection of the right process as well as for the selection of a suitable mold material are already documented in reference documents such as Stratasys® Design Guide for composite tooling. These will therefore not be further described here.

In order to build a mold 10 that exceeds the size limits of the manufacturing machines using these additive manufacturing technologies, the mold 10 is split in at least two segments 14. In the present example, the mold 10 is split in four segments 14a, 14b, 14c and 14d, although in a more general case, the mold 10 may be made of any number of segments 14 greater or equal to two. These segments 14 may be manufactured sequentially on the same machine and then assembled together. The mold 10 also comprises a support 16 made to rest on a horizontal surface, and which thereby defines a supporting plane 18. The supporting plane 18 is here defined as being in the X-Y plane. A Z axis is therefore normal to the supporting plane 18. The molding surface 12 rests on the support 16.

Figure 2:
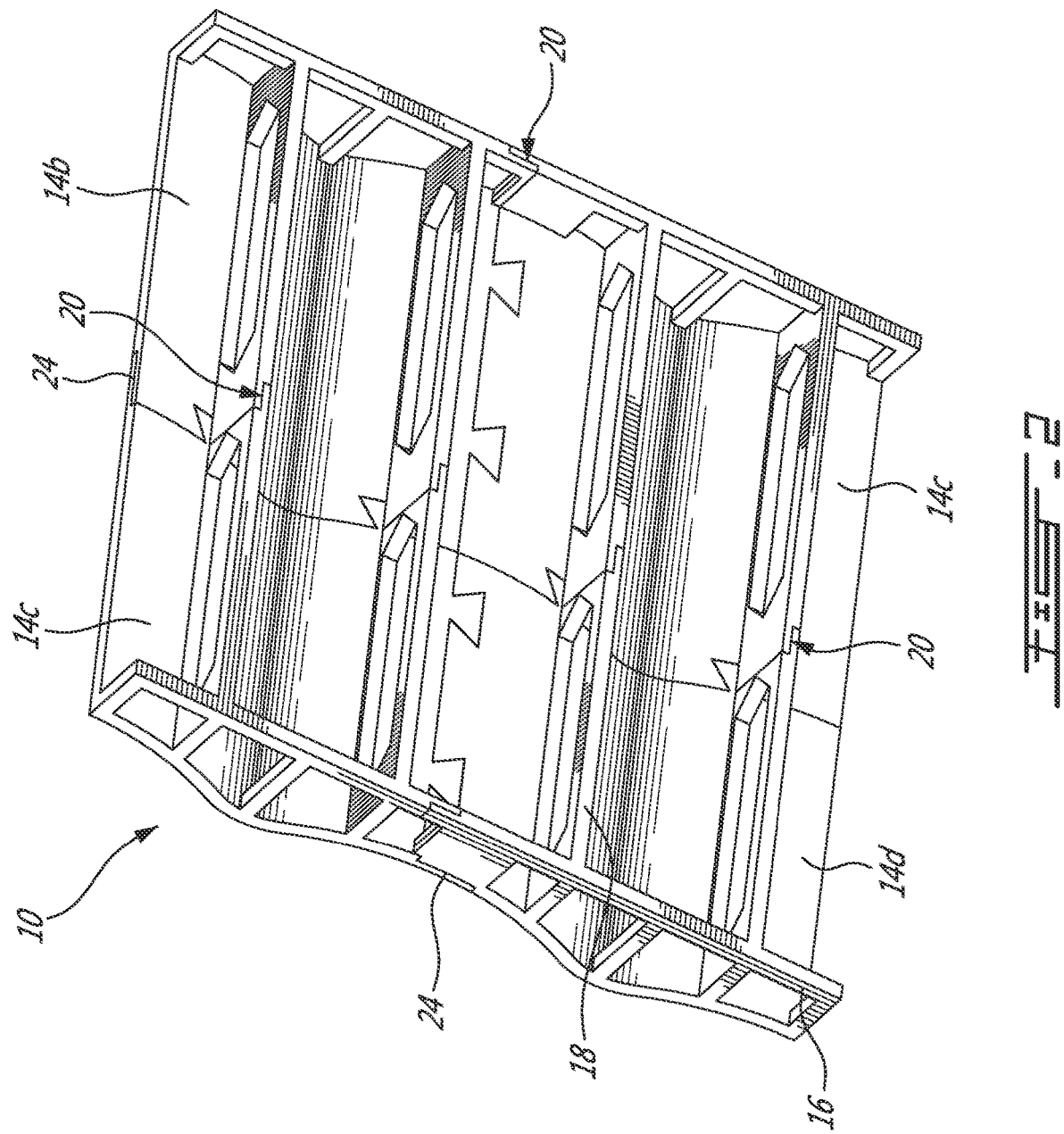
FIG. 2 is an isometric view from below showing the underside of the mold of FIG. 1.

The support 16 is best shown in FIG. 2, now concurrently referred to. The supporting plane 18 corresponds to the underside of the support 16 and is coplanar for all segments 14. The support 16 of a given segment 14 is made to overlap that of an adjacent segment 14 at a support overlapping interface 20. The segments 14 may be detachably or permanently attached to one another by attaching together adjacent supports 16 at their common support overlapping interface 20 using an adhesive, plastic welding, fasteners, or any other adequate joining technique.

For convenience, the manufacturing and assembly of the mold 10 will now be described with reference to FIG. 3 where only the two mold segments 14a and 14b will be considered. It should be understood that manufacturing and assembling mold segments 14c and 14d, or any other number of mold segments 14 must be done by following the same principles as for manufacturing and assembling mold segments 14a and 14b. In the following description, the suffix "a" or "b" added to an element's reference number means that it respectively belongs to either mold segment 14a or 14b.

Each mold segment 14 comprises its own portion of molding surface 12 bordered by at least one edge 22, at least one overlapping interface 24 and at least one interlocking element 26. Preferably, each mold segment 14 comprises at least one edge 22, at least one overlapping interface 24 and at least one interlocking element 26 for each other adjacent mold segment 14 to which it is connected. Note that edge 22 and overlapping interface 24 may each be continuous so that only a portion of them interfaces with an adjacent segment 14. Also note that edge 22 and the overlapping interface 24 do not have necessarily to be rectilinear. For example, they could be curved.

The edges 22a, 22b of the two adjacent mold segments 14a, 14b are designed to match closely together once assembled since a minimum gap between each adjacent molding surface 12a, 12b is desired. Hence, edges 22a and 22b, respectively of mold segments 14a and 14b, are designed to end up parallel and as close as possible once the segments 14a, 14b are assembled together, while still providing sufficient fit tolerance to easily assemble the adjacent segments 14a, 14b. Molding surfaces 12a, 12b may be designed to end up being tangent to each other in a plane that is normal to the edge 22 (either 22a or 22b) once assembled. Although such tangency between adjacent surfaces 12 is usual, it may not be absolutely required if, for example, there is a discontinuity in the molding surface 12. It is however the case when the component to be molded has a continuous surface but requires a mold that is too large for the capacity of the additive manufacturing machine.

The overlapping interface 24 is located at a predetermined distance D from the edge 22, anywhere between the support plane 18, best shown in FIG. 4, now concurrently referred to, and edge 22. The predetermined distance D is measured in the Z direction, that is normal to the supporting plane 18. In other words, a point Pa on the overlapping interface 24a is located at the same predetermined distance D as a corresponding point Pb located on the overlapping interface 24b. It is however preferable that the overlapping interface 24 be located in close proximity to the molding surface 12 so as to minimize dimensional variance caused by manufacturing tolerances. The overlapping interface 24 may be parallel to the supporting plane 18 while always remaining below the molding surface 12, or it may follow the molding surface 12 by being offset underneath the molding surface 12 by the predetermined distance D. When the molding surfaces 12 of two adjacent mold segments 14 are designed to be tangent to each other, the predetermined distance D of corresponding points on each overlapping interface 24 must be the same for both mold segments 14. This is the case in the example illustrated with points Pa and Pb of mold segments 14a and 14b.

When two adjacent mold segments 14 must be assembled together, such as mold segments 14a and 14b, overlapping interface 24a of mold segment 14a is designed to extend beyond its edge 22a by a predetermined distance W while the overlapping interface 24b of adjacent mold segment 14b is made to extend behind, or is set back from, its edge 22b, by at least an equivalent predetermined distance W.

The overlapping interface 24 is designed to be sufficiently wide (width being understood as extending in the direction of the adjacent mold segment) so as to provide a large overlapping area to attach together adjacent mold segments 14a, 14b, preferably using an adhesive. In order to prevent the adhesive from creating an additional thickness which would offset molding surfaces 12a, 12b, depressions 28 in which the adhesive is contained may be located in either one or both of the overlapping interfaces 24a and 24b. These depressions 28 may take different shapes. In fact, depressions 28 may be so broad so as to occupy most of the surface of the overlapping interface 24, only leaving small abutting areas, or posts, scattered on the overlapping interface 24, and with which the predetermined distance D is controlled. Alternatively, a single depression 28 could be used, defined by a ridge all around the overlapping interface 24.

In order to provide better stability of the support 16, supports 16a and 16b are provided with their own support overlapping interface 20a, 20b. An adhesive may also be applied to the support overlapping interfaces 20a, 20b to further rigidify mold 10.

In order to lock together and to precisely locate both mold segments 14a, 14b in an interlocking plane, at least one set of compatible interlocking elements 26 is provided. The compatible interlocking elements 26 are located in or proximate the overlapping interfaces 24 of each mold segment 14a, 14b intended to overlap one another. The interlocking elements 26 are positioned at a predetermined distance L from the respective edge 22 of their mold segment 14. In other words, the point Pa on interlocking element 26a is located at the same predetermined distance L as the corresponding point Pb on the interlocking element 26b of mold segment 14b.

The interlocking plane is parallel to the supporting plane 18. This means that the locking of compatible interlocking elements 26 occurs in interlocking direction 30 which is normal to the supporting plane 18 and along the Z axis. This also means that the predetermined distance D is measured in the same interlocking direction 30, or normal to the interlocking plane.

Because the interlocking elements 26 are located both remotely underneath the molding surface 12 and remotely from the edges 22, the edges 22 on the mold surfaces 12 may adopt a shape that is different from the shape of both the overlapping interface 24 and of the interlocking element 26. The interlocking elements 26 are offset both laterally from edge 22 and vertically underneath the molding surface 12, thereby creating a sealing zone 29. This sealing zone 29 provides a space between the top molding surface 12 and an underside 32 of the mold segment 14 which can be filled with adhesive. The sealing zone 29 is located between the edge 22 and the interlocking elements 26. This space contributes to sealing the top molding surface 12 from air infiltrations through joints and interstices on the underside 32, especially around the interlocking elements 26 which may have discontinuous shapes that are difficult to seal. This sealing is important when a molded component requires vacuum forming and when air must be prevented from reaching the molding surface 12. The sealing zone 29 of one mold segment 14, for example mold segment 14b is preferably flat so as to be easily sealed by the adhesive contained in the one or more depressions 28 located in an area of the overlapping interface 24a of the interlocked mold segment 14a which ends up being directly in contact with the sealing zone 29.

In the set of compatible interlocking elements 26a, 26b, a first interlocking element in mold segment 14a may be of a female type while a second interlocking element in mold segment 14b may be of a male type, or vice-versa. This is the solution depicted in FIGS. 3 and 4. For example, the set of compatible interlocking elements 26a, 26b of the two adjacent mold segments 14a, 14b may define a dovetail assembly. Note that the compatibility of each male-female interlocking elements 26 between each adjacent mold segment 14 is independent. For example a first mold segment 14a could have a male set of interlocking elements 26 for interlocking with a second mold segment 14b and a female set of interlocking elements 26 for interlocking with a third mold segment 14c.

The mold segments 14a, 14b are assembled by aligning the corresponding compatible interlocking elements 26a, 26b and bringing together both mold segments 14a, 14b along the Z axis until the overlapping interfaces 24a, 24b abut against each other. By engaging each other, the compatible interlocking elements 26a, 26b precisely locate edges 22a and 22b beside each other, and most importantly precisely juxtapose molding surfaces 12a, 12b with respect to each other so as to create, when required, a continuous molding surface 12. Moreover, combining the compatible interlocking elements 26a, 26b with the overlapping interfaces 24a, 24b allows holding captive in 5 directions both mold segments 14a, 14b with respect to each other. The compatible interlocking elements 26a, 26b hold captive the mold segments 14a, 14b in the X-Y plane while the overlapping interfaces 24a, 24b prevent both mold segments 14a, 14b from moving in one of Z+ or Z− direction, depending which mold segment is used as a reference. The adhesive applied to the overlapping interfaces 24a, 24b prevents the mold segments 14a, 14b from moving with respect to each other in the opposite Z− or Z+ direction, thereby completely securing both mold segments 14a, 14b together.

Once assembled, the mold segments 14a, 14b may be welded together along their parallel edges 22a, 22b. Although not absolutely necessary when the mold segments 14a, 14b are already bonded together at their overlapping interface 24, welding along edges 22 allow filling an eventual small assembly gap. Filler material made of either plastic or metal (depending as to whether the mold 10 has been manufactured respectively out of plastic or metal) may therefore be used during welding to better fill this assembly gap. Following the optional welding step, the molding surface 12 may be abraded to smooth out perceptible build lines, and then sealed. The molding surface 12 may then undergo a final polish, resulting in surface finishes consistent with typical industry requirements. Sealing can be performed using a range of materials depending on specific application. The most common materials used are high-temperature, two-part epoxy adhesives. Epoxy film adhesives, adhesive-backed FEP films and similar products have also been used. Once the molding surface 12 is sealed, common mold-release agents may be applied in preparation for laying up the molded part.

FIG. 5 is now concurrently referred to. As per recommended practices, the mold segment 14 may be manufactured by gradually building the molding surface 12 in a cross-flow direction 35, that is a direction normal to a printing bed 34 of the additive manufacturing machine. A first portion 36 of the support 16 is printed in a flow direction, that is in a plan parallel to the printing bed 34 while a second portion 38 of the support 16 is printed in the cross-flow direction. The second portion 38 of the support 16 may have openings 40. The openings 40 may have sides printed at substantially 45 degrees from the cross-flow direction. Similarly, sides of the interlocking elements 26 may be printed at angles ranging from 1 to 45 degrees from the printing bed 34 to provide interlocking faces 42 of the interlocking element 26, while using the capacity of the additive manufacturing machine to print at such angles without recourse to a detachable printed supporting structure.

FIG. 6 is now concurrently referred to. The method of manufacturing the mold 10 comprises manufacturing at least a first and a second mold segments 14 using an additive manufacturing technology. Manufacturing the first mold segment 14 comprises:
building a first support 100;
building a first molding surface 102 with a first edge 22a connected to the first support 16a;
building a first overlapping interface 104 at a predetermined distance D from the first edge 22a;
building a first interlocking element 106 in the first overlapping interface 24a.

Then, the method comprises manufacturing a second mold segment 14b also using the additive manufacturing technology. The manufacturing the second mold segment 14b comprises:
building a second support 200;
building a second molding surface 202 having a second edge 22b connected to the second support 16b;
building a second overlapping interface 204 at the predetermined distance D from the second edge 22b;
building a second interlocking element 206 in the second overlapping interface 24b where the second interlocking element 26b is compatible with the first interlocking element 26a;

Once at least the first and the second mold segments 14a, 14b are manufactured, they can be assembled by interlocking the second interlocking element 26b with the first interlocking element 26a at 300. This compatibly interlocks the first mold segment 14a with the second mold segment 14b in the interlocking plane parallel to the supporting plane 18. Finally, a step of abutting or pressing the second overlapping interface 24b against the first overlapping interface 24a in a direction normal to the interlocking plane so as to juxtapose the second edge 22b with the first edge 22a, the second molding surface 12b with the first molding surface 12a and the first overlapping interface 24a with the second overlapping interface 24b. Preferably, the adhesive may be applied in one of the overlapping interfaces 24a, 24b, preferably in the depressions 28, prior to the step of abutting, so as to permanently bond both mold segments 14a, 14b together. Surfaces 12a, 12b may be welded together.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. An open mold for producing components made of a moldable material, the mold comprising:
    a first mold segment made from an additive manufacturing technique, the first mold segment having:
        a first support structure defining a support plane underneath;
        a first molding surface operative to receive the moldable material, said first molding surface being supported by said first support structure, said first molding surface having a first edge;
        a first overlapping interface located between said support plane and said first edge at a predetermined distance from said first edge, said first overlapping interface extending behind said first edge;
        a first interlocking element located in said first overlapping interface;
    a second mold segment made from an additive manufacturing technique, the second mold segment having:
        a second support structure having said support plane underneath;
        a second molding surface operative to receive the moldable material, said second molding surface being supported by said second support structure, said second molding surface having a second edge;
        a second overlapping interface located between said support plane and said second edge at said predetermined distance from said second edge, said second overlapping interface extending beyond said second molding surface; and
        a second interlocking element located in said second overlapping interface, said second interlocking element being compatible with said first interlocking element so as to cooperate to interlock in an interlocking plane said first mold segment with said second mold segment, said predetermined distance being measured in a direction normal to said interlocking plane,
    wherein said first overlapping interface overlaps said second overlapping interface, said second overlapping interface abutting against said first overlapping interface in a direction normal to said interlocking plane so that said first edge is juxtaposed with said second edge and said first molding surface is juxtaposed with said second molding surface.

2. The mold of claim 1, wherein said first interlocking element is a male interlocking element and wherein said second interlocking element is a female interlocking element.

3. The mold of claim 1, wherein said first interlocking element is located remotely from said first edge and at a second predetermined distance from said first edge and wherein said second interlocking element is located remotely from said second edge and at said second predetermined distance from said second edge, said second predetermined distance being measured in said interlocking plane.

4. The mold of claim 1, wherein said interlocking plane is parallel to said support plane.

5. The mold of claim 1, wherein said first mold segment further comprises a sealing zone in said first overlapping interface and wherein said second mold segment comprises a depression in said second overlapping interface, said sealing zone being located between said first edge and said first interlocking element, said depression containing an adhesive contacting said sealing zone.

6. The mold of claim 1, wherein said second mold segment further comprises a sealing zone in said second overlapping interface and wherein said first mold segment comprises a depression in said first overlapping interface, said sealing zone being located between said second edge and said second interlocking element, said depression containing an adhesive contacting said sealing zone.

7. The mold of claim 1, wherein said first edge and said second edge are parallel.

8. The mold of claim 1, wherein said first molding surface and said second molding surface are tangent to each other in a plane normal to said first edge.

9. The mold of claim 1, wherein said second mold segment is welded to said first mold segment along said first edge.

10. The mold of claim 1, further comprising a finishing layer on said first molding surface and on said second molding surface.

11. The mold of claim 1, wherein said first support structure and said second support structure partially overlap each other in a second overlapping interface.

12. A method for manufacturing an open mold adapted to produce components made of a moldable material, the method comprising:
    manufacturing a first mold segment using an additive manufacturing technology, the manufacturing the first mold segment further having:
        building a first support defining a support plane underneath;
        building a first molding surface having a first edge, said first molding surface being connected to said first support;
        building a first overlapping interface at a predetermined distance from said first edge, said predetermined distance being measured in a direction normal to said support plane, said first overlapping interface being located between said support plane and said first edge, said first overlapping interface extending behind said first edge;
        building a first interlocking element in said first overlapping interface;
    manufacturing a second mold segment using an additive manufacturing technology, the manufacturing the second mold segment further having:
        building a second support having said support plane underneath;

building a second molding surface having a second edge, said second molding surface being connected to said second support;

building a second overlapping interface at said predetermined distance from said second edge, said second overlapping interface being located between said support plane and said second edge, said second overlapping interface extending beyond said second edge;

building a second interlocking element in said second overlapping interface;

interlocking said second interlocking element with said first interlocking element so as to compatibly interlock said first mold segment with said second mold segment in an interlocking plane, said predetermined distance being measured in a direction normal to said interlocking plane; and abutting said second overlapping interface against said first overlapping interface in a direction normal to said interlocking plane so as to juxtapose said second edge with said first edge and said second molding surface with said first molding surface.

13. The method of claim 12, wherein said second molding surface is tangent to said first molding surface in a plane normal to said first edge.

14. The method of claim 12, wherein said interlocking further comprises interlocking in a plane parallel to the support plane defined by said first support and said second support.

15. The method of claim 12, further comprising applying an adhesive in a depression of one of said first and said second overlapping interfaces and abutting said first and said second mold components against each other so as to wet a sealing zone of the other one of said first and said second overlapping interfaces with said adhesive.

16. The method of claim 12, further comprising welding said second mold segment to said first mold segment along said first edge.

17. The method of claim 16, further comprising polishing said first molding surface and said second molding surface.

18. The method of claim 17, further comprising applying a finishing layer on said first molding surface and on said second molding surface.

19. The method of claim 12, further comprising overlapping said first support structure with said second support structure, thereby defining a second overlapping interface.

* * * * *